(12) United States Patent
Iijima

(10) Patent No.: US 10,480,406 B2
(45) Date of Patent: Nov. 19, 2019

(54) GAS TURBINE CYCLE EQUIPMENT, EQUIPMENT FOR RECOVERING $CO_2$ FROM FLUE GAS, AND METHOD FOR RECOVERING EXHAUST HEAT FROM COMBUSTION FLUE GAS

(71) Applicant: MITSUBISHI HEAVY INDUSTRIES, LTD., Tokyo (JP)

(72) Inventor: Masaki Iijima, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 472 days.

(21) Appl. No.: 15/307,183

(22) PCT Filed: Apr. 24, 2015

(86) PCT No.: PCT/JP2015/062473
§ 371 (c)(1),
(2) Date: Oct. 27, 2016

(87) PCT Pub. No.: WO2015/174246
PCT Pub. Date: Nov. 19, 2015

(65) Prior Publication Data
US 2017/0114718 A1 Apr. 27, 2017

(30) Foreign Application Priority Data
May 15, 2014 (JP) .................. 2014-101758

(51) Int. Cl.
*F02C 3/30* (2006.01)
*F02C 6/06* (2006.01)
(Continued)

(52) U.S. Cl.
CPC ............ *F02C 6/06* (2013.01); *B01D 53/1425* (2013.01); *B01D 53/1475* (2013.01);
(Continued)

(58) Field of Classification Search
CPC .... F02C 1/04; F02C 3/30; F02C 3/305; F02C 7/08; F02C 7/10; F02C 7/14;
(Continued)

(56) References Cited

U.S. PATENT DOCUMENTS 4,653,268 A 3/1987 Nakamura et al.
5,386,685 A 2/1995 Frutschi
(Continued)

FOREIGN PATENT DOCUMENTS

EP 1 609 958 A1 12/2005
JP 1-19053 B2 4/1989
(Continued)

OTHER PUBLICATIONS

Translation of Written Opinion dated Aug. 4, 2015, issued in counterpart International Application No. PCT/JP2015/062473. (4 pages).
(Continued)

*Primary Examiner* — Scott J Walthour
(74) *Attorney, Agent, or Firm* — Westerman, Hattori, Daniels & Adrian, LLP

(57) ABSTRACT

By using a combustion flue gas (18) from a power turbine (16), a high-pressure secondary compressed air (12C) is subjected to heat exchange in a first heat exchange unit (19A) of an exhaust heat recovery device (19), and by using resultant heat-exchanged flue gas (18A), a low-pressure primary compressed air (12A) is subjected to heat recovery in a second heat exchange unit (19B) of a saturator (31). Then, a primary compressed air (12B) that has been subjected to heat recovery in the second heat exchange unit (19B) is introduced into a secondary air compressor (22) to increase the pressure of the air, and then the high-pressure air is subjected to heat recovery in the first heat exchange unit (19A), producing a secondary compressed air (12D).
(Continued)

The secondary compressed air (12D) is introduced into a combustor (14) and combusted using fuel.

6 Claims, 8 Drawing Sheets

(51) Int. Cl.
| | |
|---|---|
| *F02C 7/08* | (2006.01) |
| *F01K 21/04* | (2006.01) |
| *F02C 7/143* | (2006.01) |
| *B01D 53/14* | (2006.01) |
| *F02C 3/04* | (2006.01) |
| *F02C 7/14* | (2006.01) |
| *F28C 1/00* | (2006.01) |
| *F28C 1/14* | (2006.01) |
| *F22B 1/18* | (2006.01) |
| *B01D 53/62* | (2006.01) |

(52) U.S. Cl.
CPC ............. *F01K 21/047* (2013.01); *F02C 3/04* (2013.01); *F02C 3/30* (2013.01); *F02C 3/305* (2013.01); *F02C 7/08* (2013.01); *F02C 7/14* (2013.01); *F02C 7/1435* (2013.01); *F22B 1/1815* (2013.01); *F28C 1/00* (2013.01); *F28C 1/14* (2013.01); *B01D 53/62* (2013.01); *B01D 2252/204* (2013.01); *B01D 2257/504* (2013.01); *B01D 2258/0283* (2013.01); *F05D 2220/32* (2013.01); *F05D 2220/60* (2013.01); *F05D 2220/75* (2013.01); *F05D 2220/76* (2013.01); *F05D 2240/35* (2013.01); *F05D 2260/211* (2013.01); *F05D 2260/212* (2013.01); *F05D 2260/213* (2013.01); *F05D 2260/61* (2013.01); *F28C 2001/006* (2013.01); *Y02C 10/06* (2013.01); *Y02E 20/16* (2013.01); *Y02E 20/326* (2013.01)

(58) Field of Classification Search
CPC ............. F02C 7/1435; F05D 2260/211; F05D 2260/212; F05D 2260/2322
See application file for complete search history.

(56) References Cited

U.S. PATENT DOCUMENTS

| | | | |
|---|---|---|---|
| 2001/0015059 | A1 | 8/2001 | Fetescu et al. |
| 2002/0007624 | A1 | 1/2002 | Mittricker et al. |
| 2006/0107646 | A1* | 5/2006 | Hatamiya ................. F02C 3/30 60/39.53 |
| 2010/0005722 | A1* | 1/2010 | Iijima ................. B01D 53/1412 48/128 |
| 2013/0019751 | A1 | 1/2013 | Rost et al. |
| 2013/0269346 | A1 | 10/2013 | Li et al. |
| 2015/0059341 | A1 | 3/2015 | Tanimura et al. |

FOREIGN PATENT DOCUMENTS

| | | |
|---|---|---|
| JP | 6-221114 A | 8/1994 |
| JP | 2003-49665 A | 2/2003 |
| JP | 2003-83003 A | 3/2003 |
| JP | 2006-2622 A | 1/2006 |
| JP | 2013-171001 A | 9/2013 |
| JP | 2013-181442 A | 9/2013 |
| JP | 2013-217215 A | 10/2013 |
| JP | 2013-540229 A | 10/2013 |
| WO | 2001/71176 A2 | 9/2001 |
| WO | 2004/106718 A1 | 12/2004 |
| WO | 2011/076973 A1 | 6/2011 |

OTHER PUBLICATIONS

International Search Report dated Aug. 4, 2015, issued in counterpart application No. PCT/JP2015/062473. (2 pages).
Extended Search Report dated Mar. 29, 2017, issued in counterpart European Application No. 15792546.2 (9 pages).

* cited by examiner

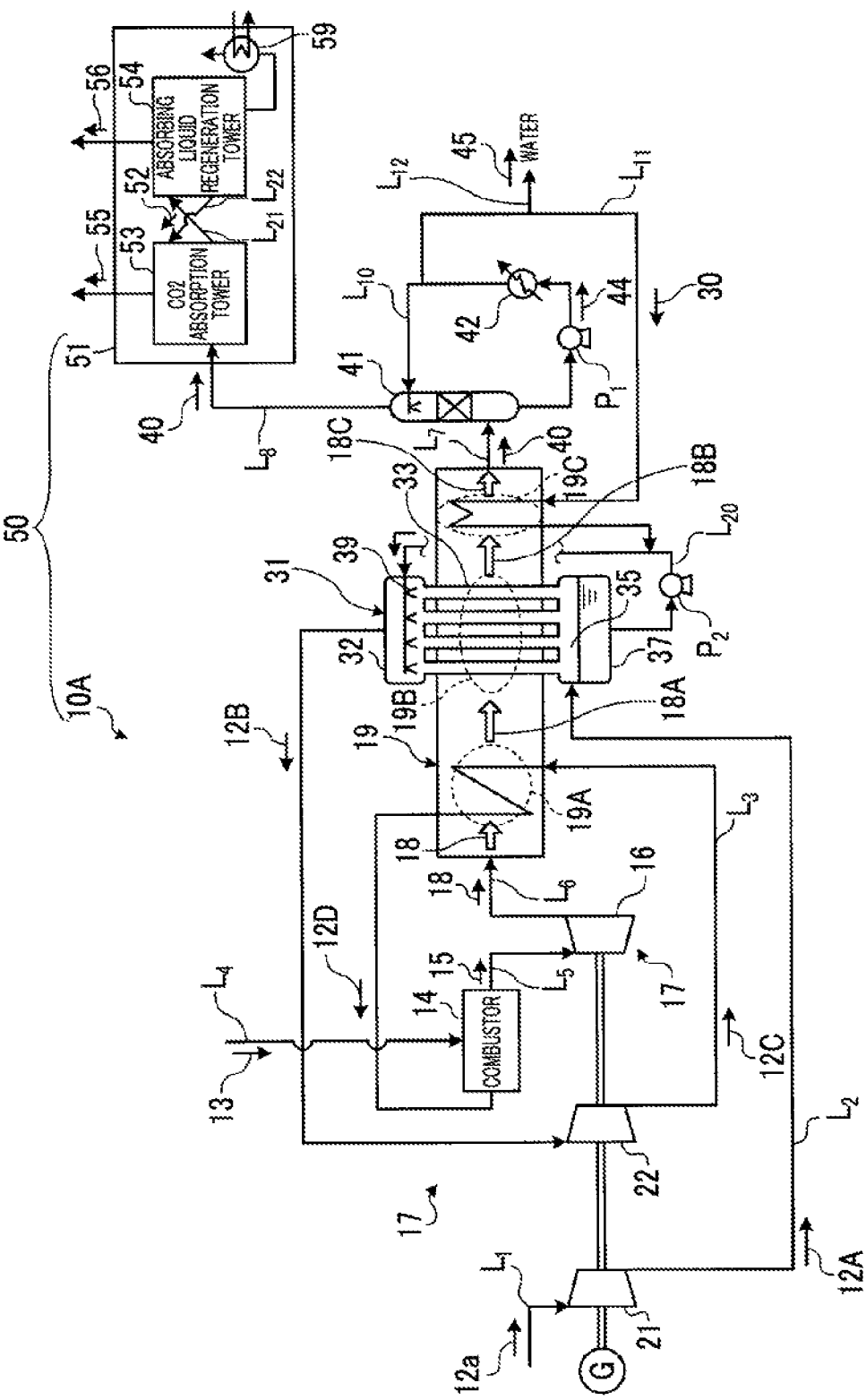

GAS TURBINE CYCLE EQUIPMENT, EQUIPMENT FOR RECOVERING $CO_2$ FROM FLUE GAS, AND METHOD FOR RECOVERING EXHAUST HEAT FROM COMBUSTION FLUE GAS

TECHNICAL FIELD

The present invention relates to gas turbine cycle equipment, equipment for recovering $CO_2$ from flue gas, and a method for recovering exhaust heat from combustion flue gas that improve cycle efficiency.

BACKGROUND ART

For example, in order to improve gas turbine (G/T) combined cycle efficiency, a heat recovery steam generator for effectively utilizing combustion flue gas from a gas turbine is used. This heat recovery steam generator (HRSG) is an apparatus that generates steam using a high-temperature combustion flue gas discharged from an exhaust heat generation source, such as a gas turbine, and is widely used in, for example, a gas turbine combined cycle (GTCC) power generation plant that supplies steam generated in the heat recovery steam generator to a steam turbine (S/T) and drives a power generator (PTLs 1 and 2).

CITATION LIST

Patent Literature

[PTL 1] Japanese Unexamined Patent Application Publication No. 2003-83003
[PTL 2] Japanese Unexamined Patent Application Publication No. 2013-171001

SUMMARY OF INVENTION

Technical Problem

However, in the related-art heat recovery steam generator, the heat recovery from a high-temperature combustion flue gas is performed at a temperature below a critical pressure using a plurality of stages, for example, high-pressure/medium-pressure/low-pressure individual economizers, an evaporator, a superheater, a reheater, and the like. Thus, heat exchange is performed so as not to reach a temperature falling line and a pinch point of the combustion flue gas. Additionally, there is a problem that reheating in the reheater is also only reheating at a temperature of about 600° C.

Hence, even in a case where a gas turbine inlet temperature is a high pressure/high temperature of, for example, 1500° C. class, the gas turbine efficiency (% LHV) is about 60%. In addition, in a case where the gas turbine inlet temperature is raised to, for example, 1700° C., there is a problem that there are various barriers against a turbine cooling technique, a heat shield coating technique, a heat-resisting material technique, and the like.

Hence, even in gas turbine equipment in which the inlet temperature is, for example, 1500° C. class, the appearance of a system that improves system efficiency is desired.

An object of the invention is to provide gas turbine cycle equipment, equipment for recovering $CO_2$ from flue gas, and a method for recovering exhaust heat from combustion flue gas that can improve gas turbine cycle efficiency in view of the above problems.

Solution to Problem

A first invention of the present invention for solving the above problems provides gas turbine cycle equipment including a gas turbine having a combustor that combusts fuel with compressed air and a power turbine that is driven by a high-temperature/high-pressure combustion gas from the combustor; and an exhaust heat recovery device that recovers heat energy from combustion flue gas that has driven the power turbine. The compressed air includes primary compressed air that is compressed by a primary air compressor that compresses air, and secondary compressed air that is compressed by a secondary air compressor that further compresses the primary compressed air. The exhaust heat recovery device includes a first heat exchange unit that performs indirect heat exchange between the combustion flue gas and the secondary compressed air, and a second heat exchange unit that passes through the first heat exchange unit, performs indirect heat exchange between combustion flue gas after first heat exchange, and the primary compressed air and supply water, in a saturator, and entrains steam in the primary compressed air. The primary compressed air, which entrains the steam that has performed heat exchange in the saturator of the second heat exchange unit, is introduced into the secondary air compressor, thereby producing high-pressure/low-temperature secondary compressed air, then heat exchange of the high-pressure/low-temperature secondary compressed air is performed in the first heat exchange unit, thereby producing high-pressure high-temperature secondary compressed air, and then, the high-pressure high-temperature secondary compressed air is introduced into the combustor.

A second invention is the gas turbine cycle equipment according to the first invention in which the saturator of the second heat exchange unit includes a supply water header that introduces the supply water thereinto, a plurality of heat exchange tubes that communicate with the supply water header at one end and are arranged within the exhaust heat recovery device, a storage header that communicates with the heat exchange tubes at the other end, stores the supply water, and has an introducing part that introduces the primary compressed air into a space of a storage part, and a supply water circulation line along which the supply water is circulated. The primary compressed air is passed through tube spaces for supply water that circulates in the shape of a wet wall along inner wall surfaces of the heat exchange tubes, the primary compressed air is subjected to heat exchange with the combustion flue gas that abuts against outer peripheries of the heat exchange tubes, steam is generated while heating the supply water, and the generated steam is entrained in the primary compressed air subjected to the heat exchange.

A third invention is the gas turbine cycle equipment according to the first or second invention, further including a cooling tower that cools a flue gas after heat exchange discharged from the exhaust heat recovery device; and a supply water supply line along which condensed water is supplied as the supply water to a supply water circulation line along which supply water circulates through the saturator.

A fourth invention is the gas turbine cycle equipment according to any one invention of the first to third inventions in which the exhaust heat recovery device further includes a third heat exchange unit that performs indirect heat exchange between the combustion flue gas after passing through the second heat exchange unit, and the supply water in the supply water supply line.

A fifth invention is equipment for recovering $CO_2$ from flue gas including the gas turbine cycle equipment according to any one invention of the first to fourth inventions; and a $CO_2$ recovery unit that recovers $CO_2$ in flue gas from the cooling tower.

A sixth invention is the equipment for recovering $CO_2$ from flue gas according to the fifth invention in which the $CO_2$ recovery unit includes a $CO_2$ absorption tower that absorbs $CO_2$ in flue gas with an absorbing liquid, and an absorbing liquid regeneration tower that regenerates the absorbing liquid which has absorbed $CO_2$, and the absorbing liquid is circulated and reused.

A seventh invention is a method for recovering exhaust heat from combustion flue gas. The method includes using the gas turbine cycle equipment according to the first invention, and subjecting the combustion flue gas from the gas turbine to heat exchange with high-pressure secondary compressed air in the first heat exchange unit of the exhaust heat recovery device, performing heat recovery of low-pressure primary compressed air, using the heat-exchanged flue gas, in the second heat exchange unit of the saturator, introducing the primary compressed air, which has recovered the heat in the second heat exchange unit, into the secondary air compressor, thereby producing high-pressure primary compressed air, then recovering heat in the first heat exchange unit, thereby producing secondary compressed air, and introducing the secondary compressed air into the combustor to combust fuel using the secondary compressed air.

Advantageous Effects of Invention

According to the invention, by using the combustion flue gas from the gas turbine, the high-pressure secondary compressed air is subjected to the heat exchange in the first heat exchange unit of the exhaust heat recovery device, and by using the heat-exchanged flue gas, the low-pressure primary compressed air is subjected to the heat recovery in the second heat exchange unit of the saturator. Then, the primary compressed air that has recovered the heat in the second heat exchange unit is introduced into the secondary air compressor, thereby producing the high-pressure primary compressed air, and then the high-pressure primary compressed air is subjected to the heat recovery in the first heat exchange unit, producing the secondary compressed air. The secondary compressed air is introduced into the combustor and fuel is combusted using the secondary compressed air, and thereby, temperature is increased up to, for example, 1500° C. Accordingly, the exhaust heat recovery efficiency of the exhaust heat recovery device can be made very high. As a result, the gas turbine cycle efficiency can be improved.

BRIEF DESCRIPTION OF DRAWINGS

FIG. 8 is a schematic view of equipment for recovering $CO_2$ from flue gas related to Example 2.

DESCRIPTION OF EMBODIMENTS

Preferable examples of the invention will be described below in detail with reference to the accompanying drawings. In addition, the invention is not limited by the examples and includes those configured by combining respective examples in a case where there are a plurality of examples.

Example 1

Figure 1A:
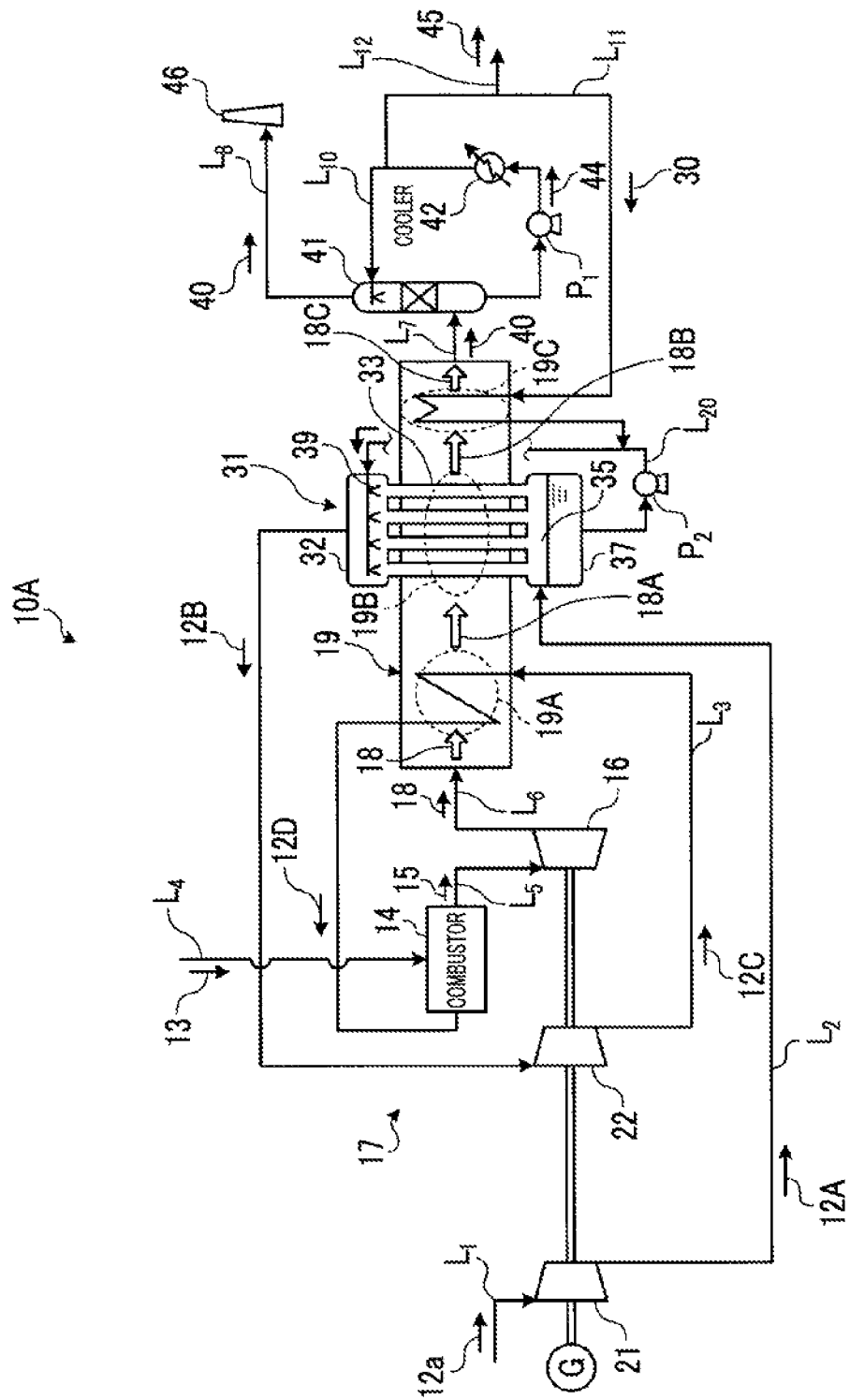
FIG. 1A is a schematic view of a gas turbine cycle equipment related to Example 1.
Figure 1B:
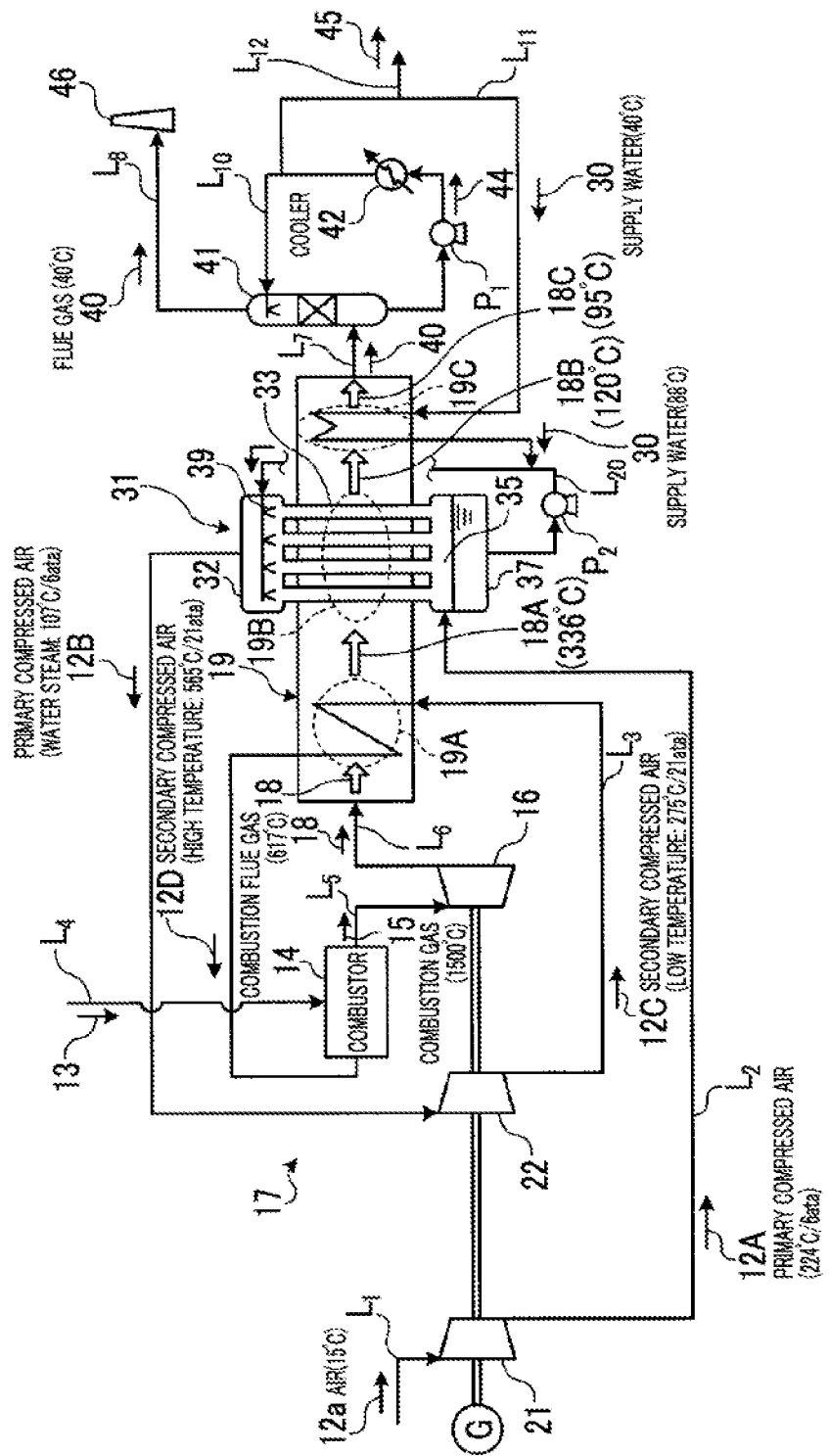
FIG. 1B is a schematic view illustrating an example of the temperature/pressure conditions of the gas turbine cycle equipment related to Example 1.

FIG. 1A is a schematic view of a gas turbine cycle equipment related to Example 1. FIG. 1B is a schematic view illustrating an example of the temperature/pressure conditions of the gas turbine cycle equipment related to Example 1.

As illustrated in FIG. 1A, the gas turbine cycle equipment 10A related to the present example includes a gas turbine 17 that has a combustor 14 that combusts fuel with compressed air and a power turbine 16 that is driven by a high-temperature/high-pressure combustion gas from the combustor 14, and an exhaust heat recovery device 19 that recovers heat energy from combustion flue gas 18 that has driven the power turbine 16. The compressed air 12 includes primary compressed air 12A that is compressed by a primary air compressor 21 that compresses air 12a, and secondary compressed air 12C that is compressed by a secondary air compressor 22 that further compresses the primary compressed air 12A. The exhaust heat recovery device 19 includes a first heat exchange unit 19A that performs indirect heat exchange between the combustion flue gas 18 and the secondary compressed air 12C, and a second heat exchange unit 19B that passes through the first heat exchange unit 19A, performs indirect heat exchange between combustion flue gas 18A after first heat exchange and the primary compressed air 12A and the supply water 30 in an saturator 31, and entrain steam 38 in the primary compressed air 12A. The primary compressed air 12B, which entrains the steam that has been subjected to heat exchange in the saturator of the second heat exchange unit 19B, is introduced into the secondary air compressor 22, thereby producing high-pressure secondary compressed air (low temperature) 12C, then heat exchange of the high-pressure secondary compressed air (low temperature) 12C in the first heat exchange unit 19A is performed, thereby producing high-pressure secondary compressed air (high temperature) 12D, and then, the high-pressure secondary compressed air (high temperature) 12D is introduced into the combustor 14 as compressed air for combustion.

In the present example, a third heat exchange unit 19C that performs heat exchange of the supply water 30, using the combustion flue gas 18B after being subjected to heat exchange in the second heat exchange unit 19B, is further provided on a downstream side of the second heat exchange unit 19B of the exhaust heat recovery device 19.

Additionally, in the present example, a cooling line $L_{10}$ including a cooling tower 41 that cools the flue gas 40 after heat exchange discharged from the exhaust heat recovery device 19, and a cooler 42 that circulates the cooling tower 41 with a pump P1, and a supply water supply line $L_{11}$ along which condensed water 44 condensed within the cooling tower 41 is supplied as the supply water 30 to the saturator 31.

In addition, in FIGS. 1A and 1B, reference sign 45 represents discharge water, 46 represents a chimney, G represents a power generator that is coupled to the power turbine 16 and generates power, $L_1$ represents an air introduction line, $L_2$ represents a primary compressed air supply line, $L_3$ represents a secondary compressed air supply line, $L_4$ represents a fuel supply line, $L_5$ represents a combustion gas supply line, $L_6$ represents a combustion flue gas discharge line, $L_7$ represents a flue gas line, $L_8$ represents a flue gas discharge line along which the flue gas 40 is to be discharged to the chimney 46, and $L_{12}$ represents a wastewater line.

The gas turbine 17 includes the primary and secondary air compressors 21 and 22, the combustor 14, and the power turbine 16. The air 12a introduced from the outside is compressed in the primary and secondary air compressors 21 and 22, and the compressed air 12 made to have high temperature/high pressure is guided to the combustor 14 side. In the combustor 14, the high-temperature/high-pressure compressed air 12, and the fuel 13 are injected and combusted, and a high-temperature (for example, 1500° C.) combustion gas 15 is generated. The combustion gas 15 is injected into the power turbine 16, and the heat energy of the high-temperature high-pressure combustion gas 15 is converted into rotational energy in the power turbine 16. The coaxial primary/secondary air compressors 21 and 22 are driven with this rotational energy, and the power generator G is driven with the rotational energy remaining after being used to drive this compressor, and generates power.

Next, the combustion flue gas 18 that has driven the power turbine 16 is guided to the exhaust heat recovery device 19 in order to recover the heat energy thereof.

This exhaust heat recovery device 19 includes the first heat exchange unit 19A and the second heat exchange unit 19B. In the first heat exchange unit 19A, as illustrated in FIG. 1B, the secondary compressed air (a low temperature of 275° C. and a pressure of 21 ata (2.1 MPa)) 12C is subjected to heat exchanged using the high-temperature (for example, 617° C.) combustion flue gas 18 discharged from the power turbine 16. Additionally, in the second heat exchange unit 19B on the downstream side of the first heat exchange unit 19A, the primary compressed air (a temperature of 224° C. and a pressure of 6 ata (0.6 MPa)) 12A is introduced into the saturator 31 and is subjected to heat exchange.

Figure 2:
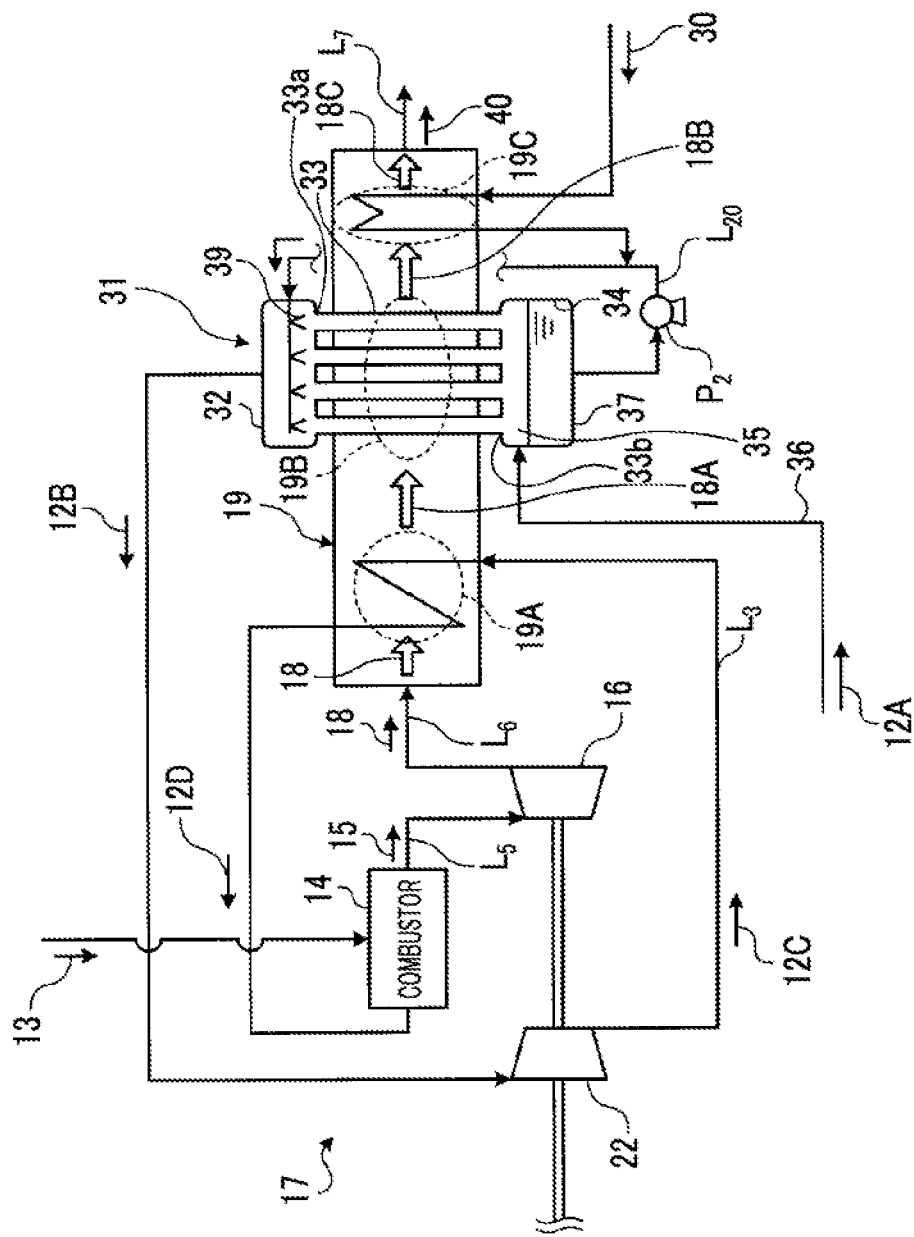
FIG. 2 is an enlarged view of main parts of the gas turbine cycle equipment related to Example 1.
Figure 3:
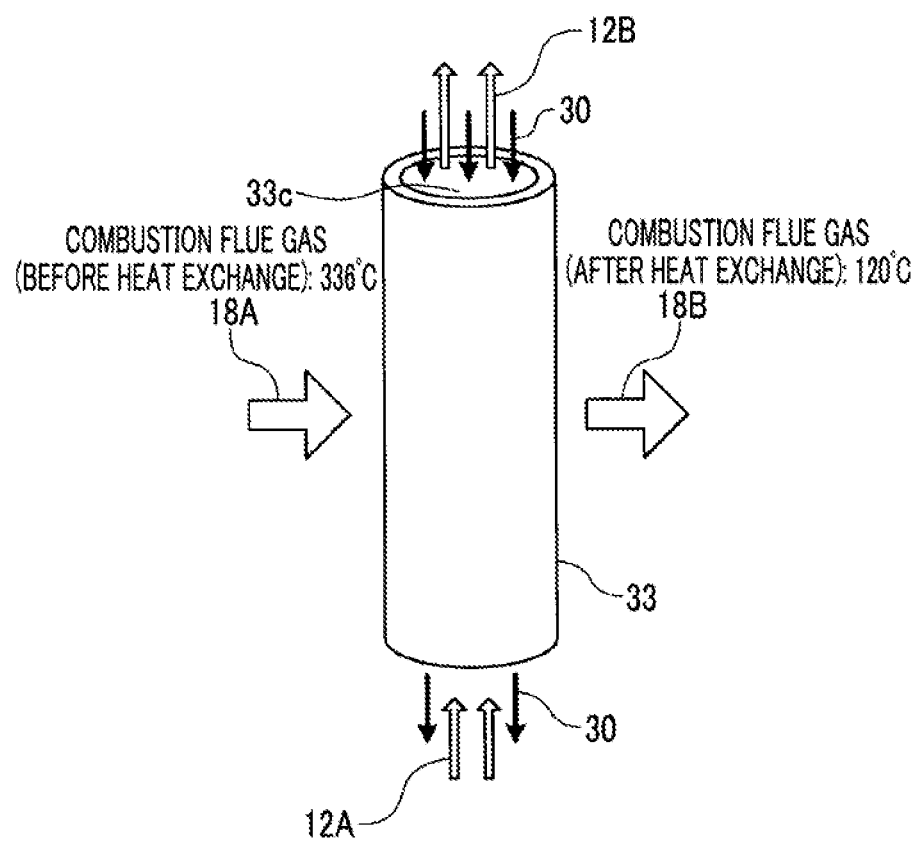
FIG. 3 is a perspective view of a heat exchange tube.

FIG. 2 is an enlarged view of main parts of FIG. 1. FIG. 3 is a perspective view of the heat exchange tube, and FIGS. 4 and 5 are schematic sectional views of the heat exchange tube.

As illustrated in FIG. 2, the saturator 31 includes a supply water header 32 that introduces the supply water condensed in the cooling tower 41 thereinto, a plurality of heat exchange tubes 33 that communicate with the supply water header 32 on one end 33a side and are arranged within the exhaust heat recovery device 19, a storage header 37 that communicates with the heat exchange tubes 33 on the other end 33b side, stores the supply water 30 within a storage part 34, and has an introducing part 36 that introduces the primary compressed air 12A into a space 35 on an upper side of the storage part 34, and a supply water circulation line $L_{20}$ along which the supply water 30 is circulated with a pump $P_2$.

Figure 4:
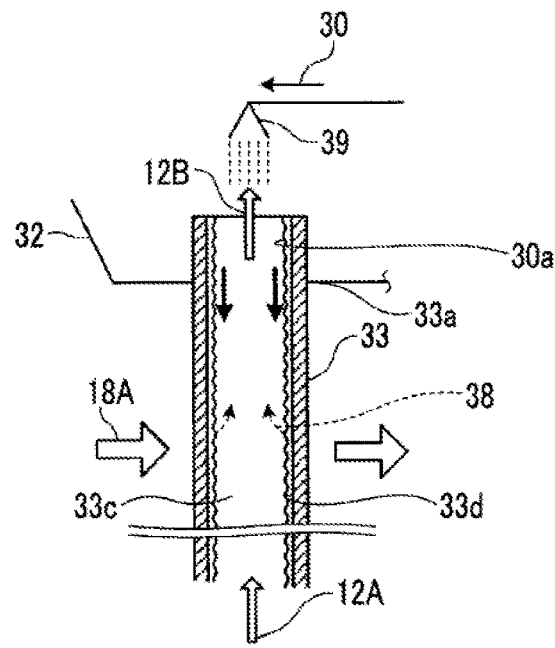
FIG. 4 is a schematic sectional view of the heat exchange tube.
Figure 5:
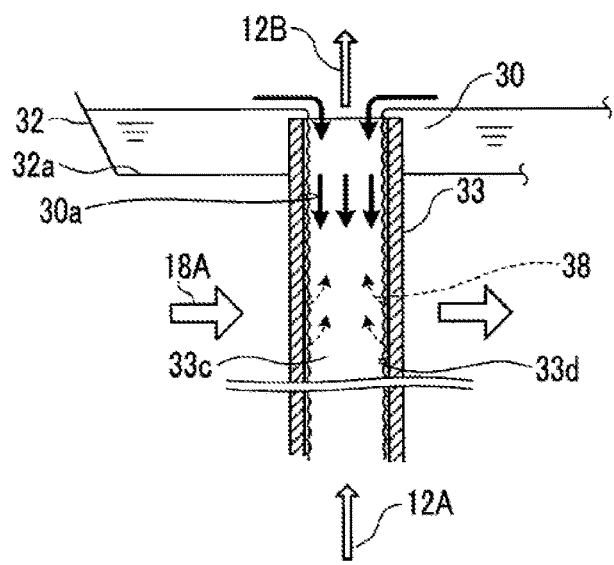
FIG. 5 is a schematic sectional view of the heat exchange tube.

FIGS. 4 and 5 are views illustrating an aspect in which supply water is supplied to each heat exchange tube 33 within the supply water header 32.

Referring to FIG. 4, a supply nozzle 39 provided in the supply water header 32 is used for the supply of the supply water 30, and the supply water 30 sprayed from the supply nozzle 39 is dropped while forming a water screen 30a in the shape of a wet wall along a wall surface 33d within the heat exchange tube 33.

Referring to FIG. 5, the supply water 30 is made to overflow from the storage part 32a of the supply water header 32 as the supply of the supply water 30, and the overflowed supply water 30 is dropped while forming the water screen 30a in the shape of a wet wall along the wall surface 33d within the heat exchange tube 33.

Then, as illustrated in FIGS. 3, 4, and 5, the primary compressed air 12A is passed from a lower side into a tube space 33c for the supply water 30 dropped and circulated by the water screen 30a along the wall surface 33d of each of the plurality of heat exchange tube 33. Then, when the primary compressed air 12A passes, the primary compressed air is subjected to heat exchange with the combustion flue gas 18A that abuts against an outer periphery of each heat exchange tube 33. In the case of this heat exchange, the steam 38 is generated while heating the supply water 30 that flows down, this generated steam 38 is entrained in the primary compressed air 12A subjected to heat exchange, and is created as the primary compressed air (water steam) 12B.

Then, for example, as illustrated in FIG. 4, the supply water 30 is injected by the supply nozzle 39 and IS made to flow into the heat exchange tube 33. The supply water 30 that has flowed into the heat exchange tube 33 is dropped while forming the water screen 30a in the shape of a wet wall along the wall surface 33d of the heat exchange tube 33, and is stored on the storage header 37 on the downstream side. The stored supply water 30 is again circulated through the supply water header 32 by the supply water circulation line $L_{20}$ via the pump $P_2$.

Then, the wet wall-like water screen 30a that flows through the inside of the heat exchange tube 33 is indirectly heated by the heat of the combustion flue gas 18A from the outside, and the supply water 30 becomes the steam 38 by heat exchange, is entrained in the primary compressed air 12A, and becomes the primary compressed air (water steam) 12B. The second heat exchange unit 19B performs heat exchange using the combustion flue gas 18A that has contributed to the heat exchange in the first heat exchange unit 19A.

Here, the primary compressed air (a pressure of 6 ata (0.6 MPa)) 12A introduced into the space 35 within the storage header 37 of the saturator 31 is cooled by the supply water 30 to be introduced, and the temperature thereof falls from 224° C. to 84° C. within the space 35.

The primary compressed air 12A made to have this low temperature (84° C.) is indirectly subjected to heat exchange with the combustion flue gas 18A after the first heat exchange, in the saturator 31 of the second heat exchange unit 19B, and becomes the primary compressed air (water steam) 12B of which the temperature reaches 107° C. (a pressure of 6 ata).

Next, the primary compressed air (water steam) 12B is introduced into the secondary air compressor 22, is subjected to second compression, and becomes the high-pressure (a pressure of 21 ata (2.1 MPa)) secondary compressed air (low temperature: 275° C.) 12C.

The secondary compressed air 12C is low (275° C.) in temperature, is capable of being subjected to heat exchange with the high-temperature (for example, 617° C.) combustion flue gas 18 in the first heat exchange unit 19A of the exhaust heat recovery device 19, and becomes the high-pressure secondary compressed air (a high temperature of 565° C.) 12D.

In the related art, in a case where one compressor is installed to perform compressing, the primary compressed air (a temperature of 224° C.) compressed by the primary air compressor is introduced into the same secondary air compressor as it is, and is introduced into the combustor as high-pressure (21 ata)/high-temperature (400° C.) compressed air.

In contrast, in the present invention, a total amount of the low-pressure (a pressure of 6 ata) primary compressed air 12A, which has passed through the primary air compressor 21 is introduced into the second heat exchange unit 19B of the exhaust heat recovery device 19, is subjected to heat exchange with the combustion flue gas 18A after being subjected to heat exchange in the first heat exchange unit 19A, in the saturator 31.

In this case, in the saturator 31, the supply water is introduced so as to lower (275° C.→84° C.) the temperature of the low-pressure (a pressure of 6 ata) primary compressed air 12A, is subjected to heat exchange with the exhaust heat of the combustion flue gas (a temperature of 336° C.) 18A after being subjected to heat exchange in the first heat exchange unit 19A, and becomes the low-pressure primary compressed air (water steam) 12B of which the temperature has been raised (107° C.). The primary compressed air (water steam) (107° C.) 12B is further compressed by the secondary air compressor 22 next, and becomes the high-pressure (a pressure of 21 ata) secondary compressed air (low temperature: 275° C.) 12C. In the case of this secondary compression, the capacity of the compressor can be made small because the temperature falls unlike a case where compression is continuous as in the related art.

Moreover, the high-pressure secondary compressed air (low temperature: 275° C.) 12C is introduced into the first heat exchange unit 19A of the exhaust heat recovery device 19, becomes the high-pressure secondary compressed air (high temperature: 565° C.) 12D, and is introduced into the combustor 14.

In the present example, since the amount of the steam 38 to be entrained is small in the case of the heat exchange of the primary compressed air 12A in the second heat exchange unit 19B, it is possible to raise combustion temperature in the combustor 14 to a high temperature of, for example, 1500° C.

Additionally, in the present example, the third heat exchange unit 19C is installed, and performs heat exchange so as to further improve the exhaust heat recovery efficiency of the combustion flue gas 18 when condensed water that has condensed moisture in the combustion flue gas 18C in the cooling tower 41 is supplied to the saturator 31 as the supply water 30. That is, since the temperature of the supply water 30 that is cooled and condensed in the cooling tower 41 is about 40° C., the supply water 30 at 40° C. is passed through the third heat exchange unit 19C, is subjected to heat exchange with the combustion flue gas (120° C.) 18B, and is supplied to the storage header 37 side as the supply water 30 at a temperature of 88° C.

In this way, when exhaust heat is recovered by performing heat exchange of the combustion flue gas 18, in the exhaust heat recovery device 19 of the present example, efficient heat exchange is performed in the first heat exchange unit 19A, the second heat exchange unit 19B, and the third heat exchange unit 19C, respectively. Thus, the heat of the high-temperature (617° C.) combustion flue gas 18 is recovered to a low temperature (95° C.), and the heat recovery efficiency improves.

Additionally, since the amount of the steam 38 entrained in the primary compressed air (water steam) 12B is small, exhaust loss becomes little.

Figure 6:
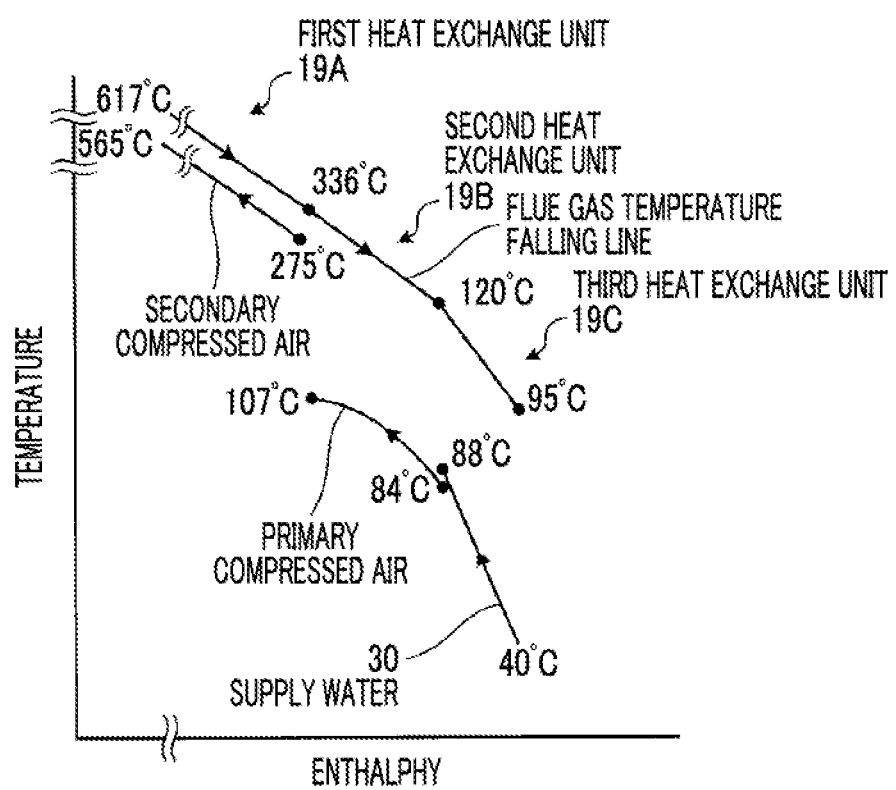
FIG. 6 is a relationship view between temperature and enthalpy in a temperature falling line of combustion flue gas and in a rising line of supply water temperature and compressed air.

FIG. 6 is a relationship view between temperature and enthalpy in a temperature falling line of an combustion flue gas and in a rising line of supply water temperature and compressed air.

As illustrated in FIG. 6, the temperature of the combustion flue gas 18 falls gradually (the first heat exchange unit 19A (617° C.→336° C.), the second heat exchange unit 19B (336° C.→120° C.), and the third heat exchange unit 19C (120° C.→95° C.)) in the first heat exchange unit 19A, the second heat exchange unit 19B, and the third heat exchange unit 19C.

In contrast, the supply water 30 rises from 40° C. to 88° C. in the third heat exchange unit 19C, and rises from 84° C. to 107° C. because the temperature of the primary compressed air 12A falls in the saturator 31. Next, the secondary compressed air 12C rises from 275° C. to 565° C. in the first heat exchange unit 19A.

Additionally, as shown in Table 1, gas turbine cycle efficiency reaches 66.76% (LHV base) depending on a relationship between input heat and exhaust loss. This made it possible to achieve a significant improvement of about 6.7% or more greater than 60% that is the gas turbine cycle efficiency of a related-art 1500° C. class.

TABLE 1

| 1. Input of Heat | Air:<br>Water: | 2.158T/Hx(1500 − 565° C.) × 0.285 = 575.05 × $10^6$ kcal/H<br>378.0T/Hx(1500 − 565° C.) × 0.556 = 196.51 × $10^6$ kcal/H |
|---|---|---|
| | Fuel: | $55.3T/Hx\dfrac{(1500-15°\text{ C.})\times 0.50 = 41.06\times 10^6 \text{ kcal/H}}{812.62\times 10^6 \text{ kcal/H}}$ |
| 2. Flue Gas Loss | Air:<br>Water: | 2.158T/Hx(95 − 15° C.) × 0.24 = 41.43 × $10^6$ kcal/H<br>378.0T/Hx(639.3 − 40.0° C.) = 226.5 × $10^6$ kcal/H |
| | Fuel: | $55.3T/Hx\dfrac{(95-15°\text{ C.})\times 0.50 = 2.21\times 10^6 \text{ kcal/H}}{270.14\times 10^6 \text{ kcal/H}}$ |
| 3. Gas Turbine Efficiency | | $\eta = \dfrac{(812.62 - 270.14)\times 106 \times 100}{812.62\times 106} = 66.76\%$ (LHV Base) |

As described above, in a gas turbine combined cycle (GTCC) power generation plant including the related-art exhaust heat recovery steam generator using a high-pressure/medium-pressure/low-pressure boiler, the efficiency (LHV) thereof that is about 60% can be markedly raised.

Figure 7:
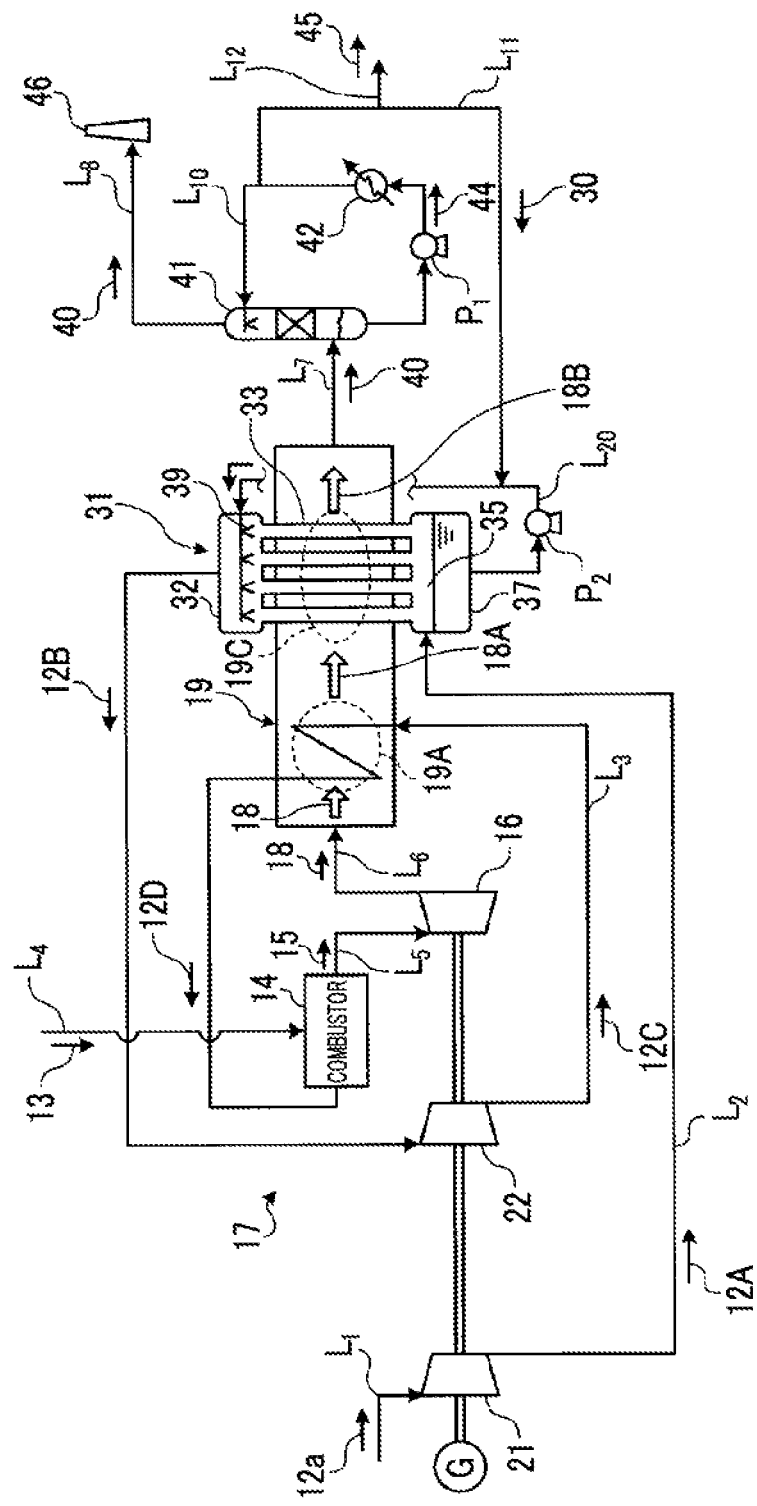
FIG. 7 is a schematic view of another gas turbine cycle equipment of Example 1.

In the present example, when exhaust heat is recovered by performing heat exchange of the combustion flue gas 18, in the exhaust heat recovery device 19 of the present example, efficient heat exchange is performed in the first heat exchange unit 19A, the second heat exchange unit 19B, and the third heat exchange unit 19C, respectively. However, the third heat exchange unit 19C may be omitted as illustrated in the gas turbine cycle equipment 10B illustrated in FIG. 7.

In this case, heat of the high-temperature (617° C.) combustion flue gas 18 is recovered to a low temperature (120° C.). As a result, the heat recovery efficiency becomes slightly lower than that of the gas turbine cycle equipment 10A of FIG. 1. However, the equipment can be simplified.

Example 2

Next, equipment for recovering $CO_2$ from flue gas related to Example 2 of the present invention will be described with reference to FIG. 8. FIG. 8 is a schematic view of the equipment for recovering $CO_2$ from flue gas related to Example 2. In addition, the same members as those of Example 1 will be designated by the same reference signs, and the description thereof will be omitted. The equipment 50 for recovering $CO_2$ from flue gas related to the present example includes the gas turbine cycle equipment 10A of Example 1, and a $CO_2$ recovery unit 51 that recovers $CO_2$ in the flue gas 40 from which the moisture from the cooling tower 41 has been removed. The $CO_2$ recovery unit 51 includes a $CO_2$ absorption tower 53 that remove $CO_2$ in the flue gas 40 after cooling in the cooling tower 41, using an absorbing liquid 52, and an absorbing liquid regeneration tower 54 that regenerates the absorbing liquid 52.

Generally, in a case where an amine-based absorbing liquid, for example, is used as the absorbing liquid 52, the $CO_2$ recovery unit 51 makes the amine absorbing liquid to absorb and remove $CO_2$ contained in the flue gas 40 within the $CO_2$ absorption tower 53, and discharges the removed $CO_2$ as a treated flue gas 55 from a top side of the $CO_2$ absorption tower 53. Additionally, the absorbing liquid 52 that has absorbed $CO_2$ is regenerated by steam stripping using a reboiler 59, in the absorbing liquid regeneration tower 54, and forms closed-system circulation lines $L_{21}$ and $L_{22}$ to be again reused in the $CO_2$ absorption tower 53. In addition, within the $CO_2$ absorption tower 53, the amine-based absorbing liquid is, for example, brought into opposed contact with the flue gas 40 so as to take $CO_2$ into the amine absorbing liquid. Here, on the absorbing liquid regeneration tower 54 side, the gas 56 containing $CO_2$ removed by the steam stripping is discharged, moisture is removed by a gas-liquid separator, and $CO_2$ is recovered as gas.

In the related art, in a case where $CO_2$ in flue gas is recovered, a cooling tower is separately provided on a preceding stage side of the $CO_2$ recovery unit so as to cool the flue gas. However, in Example 1, the flue gas 40 is cooled by the cooling tower 41 for obtaining the supply water 30. Thus, it becomes unnecessary to separately install cooling equipment in the equipment 50 for recovering $CO_2$ from flue gas in the present example. Additionally, in ordinary gas turbines, $CO_2$ concentration in flue gas is as low as 3.5 to 4.0 Vol. %. However, in the present gas turbine cycle, $CO_2$ concentration in flue gas rises as high as 5 to 7 Vol. %. As a result, the amount of the flue gas can be reduced, and the $CO_2$ recovery unit can be made compact.

In addition, in the present example, a case including the $CO_2$ absorption tower 53 that absorbs $CO_2$ in the flue gas 40 with the absorbing liquid 52, and the absorbing liquid regeneration tower 54 that regenerates the absorbing liquid 52 that has absorbed $CO_2$ has been described as the $CO_2$ recovery unit 51. However, the present invention is not limited to this. Arbitrary equipment may be used as long as the equipment can recover $CO_2$ in flue gas.

REFERENCE SIGNS LIST 10A, 10B: GAS TURBINE CYCLE EQUIPMENT
12a: AIR
12: COMPRESSED AIR
12A: PRIMARY COMPRESSED AIR
12B: PRIMARY COMPRESSED AIR (WATER STEAM)
12C: SECONDARY COMPRESSED AIR (LOW TEMPERATURE)
12D: SECONDARY COMPRESSED AIR (HIGH TEMPERATURE)
13: FUEL
14: COMBUSTOR
15: COMBUSTION GAS
16: POWER TURBINE
17: GAS TURBINE
18, 18A to 18C: COMBUSTION FLUE GAS
19: EXHAUST HEAT RECOVERY DEVICE
19A: FIRST HEAT EXCHANGE UNIT
19B: SECOND HEAT EXCHANGE UNIT
19C: THIRD HEAT EXCHANGE UNIT
21: PRIMARY AIR COMPRESSOR
22: SECONDARY AIR COMPRESSOR
31: SATURATOR
32: SUPPLY WATER HEADER
33: HEAT EXCHANGE TUBE
34: STORAGE PART
35: SPACE
37: STORAGE HEADER
38: STEAM
40: FLUE GAS
50: EQUIPMENT FOR RECOVERING $CO_2$ FROM FLUE GAS
51: $CO_2$ RECOVERY UNIT

The invention claimed is:

1. A method for recovering exhaust heat from combustion flue gas produced by a system, the system comprising a gas turbine having a combustor configured to combust fuel with compressed air, a power turbine configured to be driven by combustion flue gas from the combustor, and an exhaust heat recovery device configured to receive the combustion flue gas from the power turbine and recover heat energy from the combustion flue gas, wherein the gas turbine comprises a primary air compressor and a secondary air compressor, the primary air compressor being configured to compress air to produce primary compressed air, the secondary air compressor being configured to compress the primary compressed air to produce secondary compressed air, wherein the compressed air includes the primary compressed air and the secondary compressed air, wherein the exhaust heat recovery device includes a heat exchanger configured to perform indirect heat exchange between the combustion flue gas and the secondary compressed air, and a saturator provided downstream, with respect to a flow of the combustion flue gas through the exhaust heat recovery device, from the heat exchanger and configured to perform indirect heat exchange between the combustion flue gas and the primary compressed air and supply water, the saturator being configured to permit steam to be entrained in the primary compressed air, wherein the saturator includes a supply water header configured to introduce the supply water into the saturator, a plurality of heat exchange tubes configured to communicate with the supply water header at a first end of the saturator and which are arranged within the saturator, a storage header configured to communicate with the plurality of heat exchange tubes at a second end of the saturator, the storage header having an introducing part configured to introduce the primary compressed air into a space in the storage header for storing the supply water, the saturator further including a supply water circulation line by which the supply water is circulated through the saturator, wherein the saturator is configured to pass the primary compressed air through spaces within the plurality of the heat exchange tubes through which the supply water circulates in the shape of a wet wall along inner wall surfaces of the plurality of heat exchange tubes, the saturator is further configured to perform heat exchange with the combustion flue gas flowing against outer peripheries of the plurality of heat exchange tubes to generate steam from the supply water, and the saturator being configured to permit the generated steam to be entrained in the primary compressed air flowing through the saturator, wherein the system is configured to first introduce the primary compressed air to the saturator in which the steam is entrained by the primary compressed air and compress the primary compressed air to produce the secondary compressed air in the secondary air compressor, then heat the secondary compressed air in the heat exchanger, and then introduce the heated secondary compressed air into the combustor, the method comprising:

subjecting the combustion flue gas from the gas turbine to heat exchange with the secondary compressed air in the heat exchanger of the exhaust heat recovery device;

recovering heat from the combustion flue gas via heat exchange between the combustion flue gas and the primary compressed air in the saturator after subjecting the combustion flue gas to heat exchange with the secondary compressed air in the heat exchanger;

introducing the primary compressed air from the saturator into the secondary air compressor, thereby producing the secondary compressed air, then recovering heat from the combustion flue gas via heat exchange with the secondary compressed air in the heat exchanger, thereby heating the secondary compressed air; and introducing the heated secondary compressed air into the combustor to combust fuel.

2. A system comprising:
a gas turbine having a combustor configured to combust fuel with compressed air and a power turbine configured to be driven by combustion flue gas from the combustor; and
an exhaust heat recovery device configured to receive the combustion flue gas from the power turbine and recover heat energy from the combustion flue gas,
wherein the gas turbine comprises a primary air compressor and a secondary air compressor, the primary air compressor configured to compress air to produce primary compressed air, the secondary air compressor configured to compress the primary compressed air to produce secondary compressed air, wherein the compressed air includes the primary compressed air and the secondary compressed air,
wherein the exhaust heat recovery device includes:
a heat exchanger configured to perform indirect heat exchange between the combustion flue gas and the secondary compressed air, and
a saturator provided downstream, with respect to a flow of the combustion flue gas through the exhaust heat recovery device, from the heat exchanger and configured to perform indirect heat exchange between the combustion flue gas and the primary compressed air and supply water, the saturator being configured to permit steam to be entrained in the primary compressed air,
wherein the saturator includes:
a supply water header configured to introduce the supply water into the saturator,
a plurality of heat exchange tubes configured to communicate with the supply water header at a first end of the saturator, the plurality of heat exchange tubes being arranged within the saturator,
a storage header configured to communicate with the plurality of heat exchange tubes at a second end of the saturator, the storage header having an introducing part configured to introduce the primary compressed air into a space in the storage header for storing the supply water, and
a supply water circulation line via which the supply water is circulated through the saturator,
wherein the saturator is configured to pass the primary compressed air through spaces within the plurality of the heat exchange tubes through which the supply water circulates in the shape of a wet wall along inner wall surfaces of the plurality of heat exchange tubes, is configured to perform heat exchange with the combustion flue gas flowing against outer peripheries of the plurality of heat exchange tubes to generate steam from the supply water, and is configured to permit the generated steam to be entrained in the primary compressed air flowing through the saturator; and
wherein the system is configured to first introduce the primary compressed air to the saturator in which the steam is entrained by the primary compressed air and compress the primary compressed air to produce the secondary compressed air in the secondary air compressor, then heat the secondary compressed air in the heat exchanger, and then introduce the heated secondary compressed air into the combustor.

3. The system according to claim 2, further comprising:
a cooling tower configured to cool the combustion flue gas discharged from the exhaust heat recovery device; and
a supply water supply line configured to supply condensed water as the supply water to the supply water circulation line.

4. The system according to claim 3, wherein the heat exchanger is a first heat exchanger and wherein the exhaust heat recovery device further includes an additional heat exchanger downstream, with respect to the flow of combustion flue gas through the exhaust heat recovery device, from the first heat exchanger and the saturator, the additional heat exchanger configured to perform indirect heat exchange between the combustion flue gas and the supply water in the supply water supply line.

5. The system according to claim 3, comprising:
   a $CO_2$ recovery apparatus that recovers $CO_2$ in the combustion flue gas from the cooling tower.

6. The system according to claim 5, wherein the $CO_2$ recovery apparatus includes a $CO_2$ absorption tower configured to absorb $CO_2$ from the combustion flue gas with an absorbing liquid, and an absorbing liquid regeneration tower configured to regenerate the absorbing liquid which has absorbed $CO_2$, wherein the absorbing liquid is circulated and reused.

* * * * *